United States Patent [19]

De Jong

[11] 3,798,761

[45] Mar. 26, 1974

[54] METHOD OF FORMING FLAT END FACES OF WIRE-SHAPED CURRENT CONDUCTORS WHICH ARE PASSED THROUGH A GLASS BOTTOM OF A SEMICONDUCTOR BASE

[76] Inventor: Cornelis De Jong, Emmasingel, Eindhoven, Netherlands

[22] Filed: Aug. 8, 1972

[21] Appl. No.: 278,735

[30] Foreign Application Priority Data

Aug. 11, 1971 Netherlands ....................... 7111031

[52] U.S. Cl. ............... 29/624, 29/203 D, 29/630 R, 29/630 D, 174/50.56, 174/50.61, 339/218 R, 339/275 R

[51] Int. Cl. ........................................... H05k 13/00

[58] Field of Search...... 29/630 R, 630 D, 624, 625, 29/626, 627; 65/59, 138, 154, 155, 139, 140; 339/17 B, 17 C, 17 CF, 17 D, 17 CC, 217 R, 218 R, 219 R, 220 R, 275 R, 275 A, 275 B; 174/50.52, 50.54, 50.56–50.61

[56] References Cited

UNITED STATES PATENTS

| | | | |
|---|---|---|---|
| 3,186,065 | 6/1965 | Hunt | 29/630 D |
| 3,199,967 | 8/1965 | Pixley | 65/59 X |
| 3,257,708 | 6/1966 | Stricker | 65/155 UX |

*Primary Examiner*—Charles W. Lanham
*Assistant Examiner*—Joseph A. Walkowski
*Attorney, Agent, or Firm*—Frank R. Trifari

[57] ABSTRACT

A method of forming flat end faces of at least a number of wire-shaped current conductors which are passed through a glass bottom of a semiconductor base, in which the conductors are first sealed in the glass bottom after which the assembly is placed with its lower side on a support, the end face of conductor parts projecting from the base on the upper side being upset by means of a pressure member to a desirable length, and a flat end face being formed on the conductor ends with a simultaneous increase of the cross-section.

4 Claims, 3 Drawing Figures

METHOD OF FORMING FLAT END FACES OF WIRE-SHAPED CURRENT CONDUCTORS WHICH ARE PASSED THROUGH A GLASS BOTTOM OF A SEMICONDUCTOR BASE

The invention relates to a method of forming flat end faces of at least a number of wire-shaped current conductors in the form of wires which are passed through a glass bottom of a semiconductor base, the conductors being previously sealed in the glass bottom.

It is known to machine the ends of the current conductor wires projecting upwards from a transistor base so as to be flat with the purpose of contacting a semiconductor body directly to the ends of the wires. The wires are ground flat by means of a grinding tool. A very flat construction of the end faces of the current conductors is also necessary in behalf of, for example, the ultrasonic welding of connection wires to said end faces to be provided between the semiconductor body and the conductors. It is furthermore desirable to give the ends of the conductors projecting above the glass bottom a short construction so as to prevent resonance of the wire ends during the ultrasonic welding operation. Grinding the ends of the wires so that they are very short is difficult to perform, grinding takes a comparatively long period of time and burrs are formed the removal of which requires an extra operation.

It is the object of the invention to provide a method of the above-mentioned type in which a semiconductor base is obtained in a rapid and simple manner with short conductor ends which have a very flat end face. In order to reach the end in view, according to the invention, the base is placed with its lower side on a support and a pressure is then exerted on the end face of the conductor parts present on the upper side of the base by means of a pressure member, the said conductor parts being upset to the desirable length while forming a flat end face and an increase of the cross-section.

By upsetting the conductor parts by means of the flat side of the pressure member it is achieved that the end faces of the conductors have a flatness deviation which is less than 10 microns. The cross-section of the wire also increases, which is very favourable in particular in behalf of the programmed bonding of the connection wires. Furthermore, a sharp transition is formed between the lateral surface of the conductor wires and the end face, which is favourable so as to break the extension of the connection wires after bonding said wire between the semiconductor body and the conductor wire. The machining speed is high and since no burrs are formed, extra operational steps are avoided.

In a favourable embodiment of the method according to the invention, the pressure member upon upsetting the conductor wires is moved to against a stop member. A very accurately determined height of the conductor ends projecting above the glass bottom is obtained, which is extremely favourable for adjusting a bonding tool for the connection wires. The distance from the lower side of the base to the conductor ends shows a tolerance of less than 20 microns.

During upsetting the wire ends, surface cracks may be formed in the glass bottom. These cracks do not continue throughout the bottom so that the vacuum tightness is not influenced. Traces of a detergent which is used to remove dirt and grease from the base after its manufacture may remain in the surface cracks. As a result of this a small decrease of the electric insulation formed by the glass bottom may occur between the conductors. In order to avoid the possibility of this small decrease of electric insulation, according to a further embodiment of the invention, the base is heated after upsetting the wires and the glass bottom is remelted. This remelting need be carried out for only a short period of time at a comparatively low temperature, for example at a temperature of approximately 700° C for a few minutes.

The invention will be described in greater detail with reference to an embodiment shown in the drawing.

Figure 1:
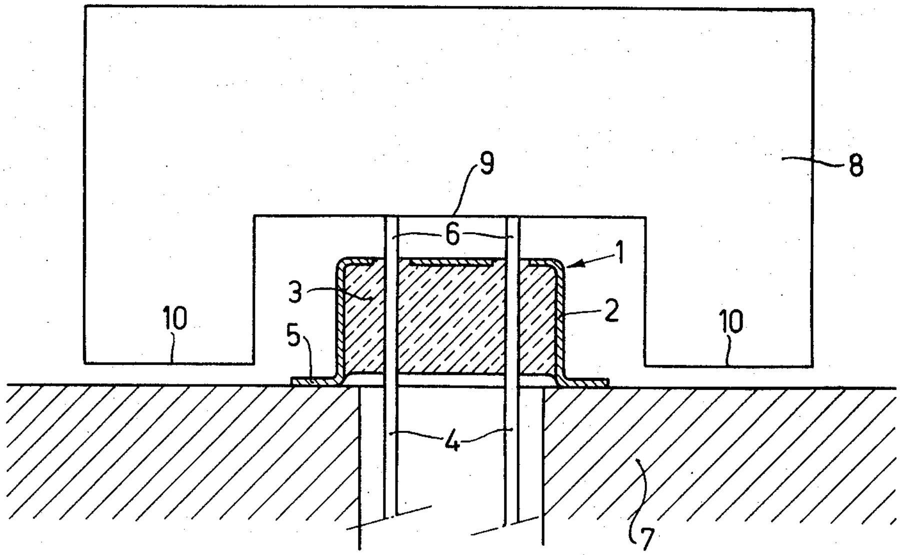
FIG. 1 shows a semiconductor base placed on a support and a pressure member for upsetting the conductor parts.

In the embodiment shown, the base 1 is of the TO 3 type. It comprises a metal base cap 2 having a flange 5 and furthermore a glass bottom 3 in which current conductors 4 are sealed in a vacuum-tight manner. In this embodiment the conductor parts 6 projecting above the base are cut off to a length of approximately 0.6 mm. The end face of the conductor parts then is not readily flat. The base 1 is then placed with its flange 5 on a support 7 of which only a part is shown. A U-shaped pressure member 8 is then provided over the base with a side 9 above the conductor parts 6. The side 9 is very smooth at least at the area of the conductor parts 6.

By moving the pressure member 8 in the direction of the support 7, pressure is exerted on the conductor parts 6 and said conductor parts are upset to a smaller height, for example, a height of 0.35 mm. Surface 9 ensures that the end faces of the conductor parts are formed very flat.

Figure 2:
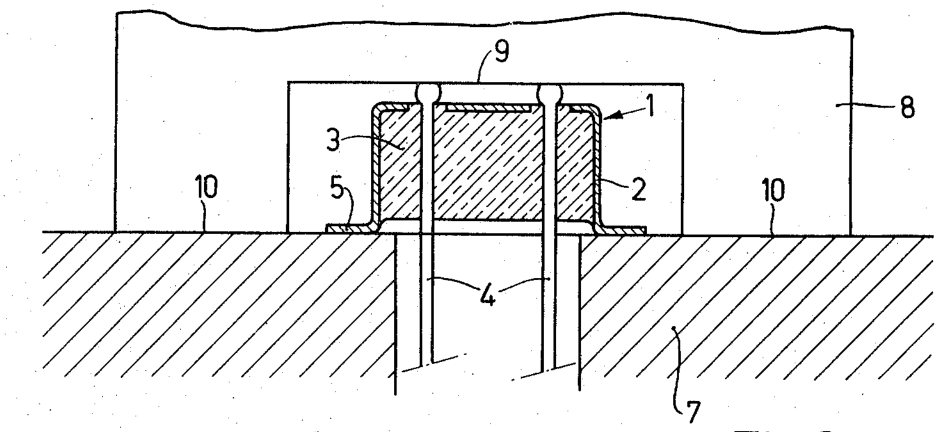
FIG. 2 shows the position of the pressure member relative to the base when upsetting is completed and, FIG. 3 shows on an enlarged scale a part of the base having an upset conductor part.

FIG. 2 shows the end of the stroke of the pressure member 8. The height to be upset in the embodiment shown is determined by the distance between the side 9 of the pressure member 8 and the abutment sides 10 of the limbs of said member. The sides 10 are pressed to against the support which in this embodiment thus forms the stop member for the pressure member.

Figure 3:
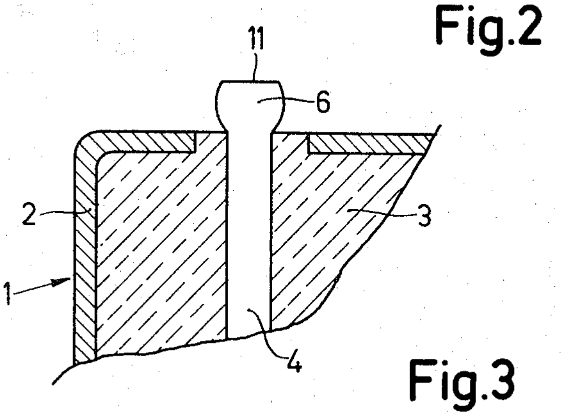

FIG. 3 shows a part of the base with an upset conductor end 6 on an enlarged scale. This end of the conductor has obtained a barrel-shaped appearance. The end face 11 is very accurately flat, the thickness deviation being less than 10 microns. Furthermore, said end face has obtained a cross-section which is well over 20 percent larger than the original cross-section of the wire, which is very favourable in particular in the programmed connection of connection wires to said end face.

The resulting base is preferably heated for a short period of time at a comparatively low temperature. The glass bottom 3 is remelted, so that surface cracks possibly formed in the glass during upsetting the conductors are removed.

In the above-described manner a semiconductor base is obtained which can be manufactured in a simple and rapid manner; obtaining the short conductor ends in a different manner is associated with great difficulties. The short conductor parts are favourable in case a connection wire is welded ultrasonically to the end face, since co-resonation of the conductor part is prevented. Furthermore, due to their small height the conductor parts form no hindrance for the connection tool of the connection wires during connecting the wire to a contact place of the semiconductor body provided on the base. During upsetting, a sharp transition is formed between the end face 11 of the conductor part and the barrel-shaped circumference, which is favourable for breaking the connection wires after contacting to semiconductor body and conductor end.

The base need not be of the TO3 type, other bases having a larger number of conductor wires may also be formed by means of the method described. Nor need the length of the upset conductor ends in a base be equal but said length may be constructed differently by giving the desirable shape to the surface 9 of the pressure member. It is also possible that not all the conductor ends are upset. Furthermore, the pressure member need not be in the form of a U, the stop member being obtained differently.

What is claimed is:

1. In a method of forming a semiconductor base wherein wire-shaped conductors are passed through and sealed in a glass bottom portion of a base, said conductors having an end portion protruding a short distance above said base for electrical connection with a semiconductor body, a method of forming flat end faces on said protruding end portions to facilitate electrical connection of said semiconductor body thereto, comprising the steps of:

supporting said base to thereby support said conductors sealed therein against axial forces;

pushing a rigid flat surface axially against the ends of said protruding end portions with sufficient axial force to upset said protruding end portions to a desirable length thereby also forming flat end faces thereon and increasing the cross-section thereof.

2. A method as defined in claim 1 wherein said flat surface is pushed to a predetermined position relative to said supported base to accurately control the final length of said protruding end portions.

3. A method as defined in claim 1 and further comprising after said pushing step, the additional step of heating the base to assure the removal of any cracks in said glass bottom which may have resulted from stresses during said pushing step.

4. A method as defined in claim 3 wherein said base is heated to a temperature of approximately 700° C.

* * * * *